(12) United States Patent
Chapman, Jr. et al.

(10) Patent No.: US 7,579,956 B2
(45) Date of Patent: Aug. 25, 2009

(54) SYSTEM AND METHOD FOR CONTROLLING IGNITION SOURCES AND VENTILATING SYSTEMS DURING HIGH CARBON MONOXIDE CONDITIONS

(75) Inventors: John Gilman Chapman, Jr., Delaware, OH (US); Nicholas Ashworth, Dublin, OH (US); Robert Burt, Columbus, OH (US); Timothy E. Wallaert, New Hudson, MI (US)

(73) Assignee: Robertshaw Controls Company, Carol Stream, IL (US)

( * ) Notice: Subject to any disclaimer, the term of this patent is extended or adjusted under 35 U.S.C. 154(b) by 676 days.

(21) Appl. No.: 11/031,296

(22) Filed: Jan. 6, 2005

(65) Prior Publication Data

US 2005/0156730 A1    Jul. 21, 2005

Related U.S. Application Data

(60) Provisional application No. 60/535,423, filed on Jan. 8, 2004.

(51) Int. Cl.
*G08B 17/10*    (2006.01)
(52) U.S. Cl. .................. 340/632; 340/628; 340/506; 340/521
(58) Field of Classification Search .............. 340/506, 340/521, 632, 511, 589–599; 62/132; 700/276–278; 126/99; 137/78.1–78.5; 237/12.3; 165/26, 165/28
See application file for complete search history.

(56) References Cited

U.S. PATENT DOCUMENTS

| | | | | |
|---|---|---|---|---|
| 4,289,272 A * | 9/1981 | Murase et al. ............ 236/91 D |
| 5,040,455 A * | 8/1991 | Doi et al. .................... 454/75 |
| 5,260,687 A * | 11/1993 | Yamauchi et al. .......... 340/522 |
| 5,691,703 A * | 11/1997 | Roby et al. ................. 340/628 |
| 5,793,296 A * | 8/1998 | Lewkowicz ................. 340/632 |
| 5,797,358 A * | 8/1998 | Brandt et al. ............. 122/448.1 |
| 6,263,685 B1 * | 7/2001 | Strobel ....................... 62/133 |
| 6,433,696 B1 * | 8/2002 | Deiterman et al. ......... 340/632 |
| 6,484,951 B1 * | 11/2002 | Mueller ..................... 237/2 A |
| 6,776,708 B1 | 8/2004 | Daoutis |
| 6,779,735 B1 * | 8/2004 | Onstott ...................... 236/13 |
| 7,005,994 B2 * | 2/2006 | King .......................... 340/628 |
| 2002/0183001 A1 * | 12/2002 | Holter et al. ............... 454/239 |
| 2003/0087600 A1 * | 5/2003 | Meneely, Jr. ............... 454/343 |
| 2004/0083029 A1 * | 4/2004 | Bicknell .................... 700/276 |
| 2005/0046563 A1 * | 3/2005 | Whitney .................... 340/506 |
| 2005/0078003 A1 * | 4/2005 | King .......................... 340/506 |

* cited by examiner

*Primary Examiner*—Davetta W Goins
*Assistant Examiner*—Hoi C Lau
(74) *Attorney, Agent, or Firm*—Reinhart Boerner Van Deuren P.C.

(57) ABSTRACT

Upon detection of a high carbon monoxide condition, an intelligent thermostat regulates operation of appliances that have sources of combustion which could be the source of or may exacerbate the high carbon monoxide condition. This hazardous condition is detected by a detector and communicated to the intelligent thermostat by wired or wireless communications. The intelligent thermostat then communicates with these appliances either via wired or wireless communications. The intelligent thermostat may also operate a ventilation system to flush the environment with fresh air to minimize or eliminate the hazardous condition. External and internal temperature sensors allow coordinated operation of the ventilating and heating systems to flush the environment with fresh air without causing a freezing condition to exist within the environment.

4 Claims, 2 Drawing Sheets

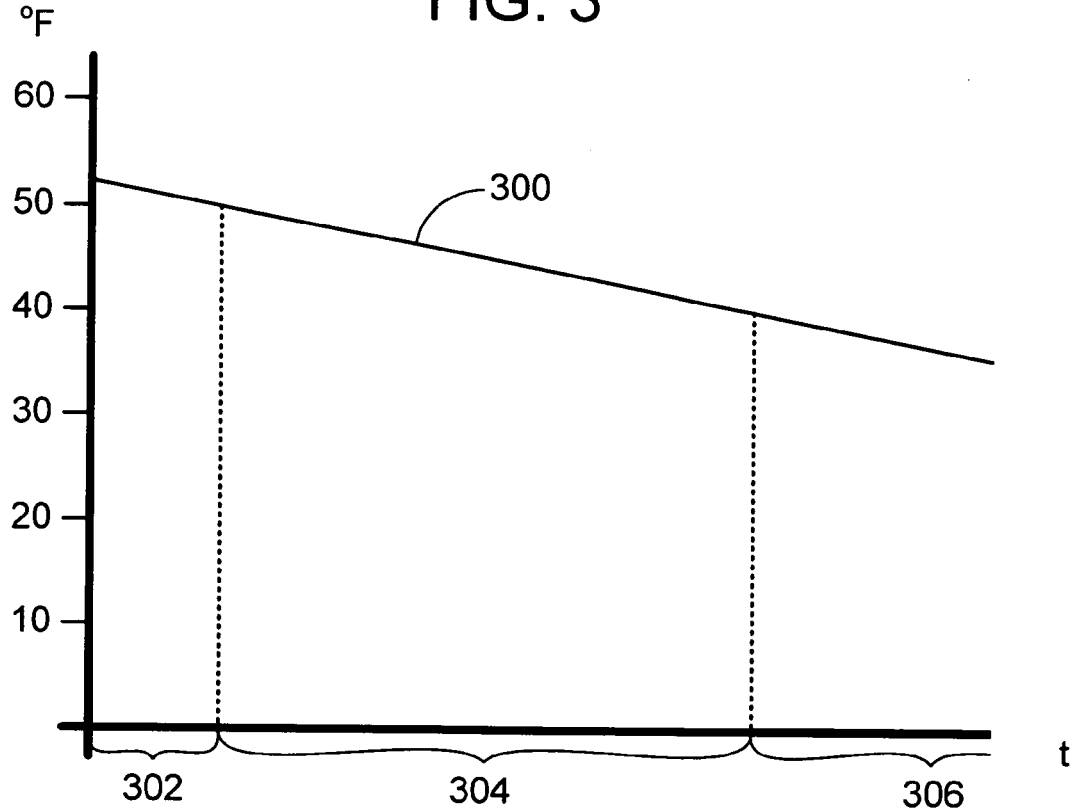

SYSTEM AND METHOD FOR CONTROLLING IGNITION SOURCES AND VENTILATING SYSTEMS DURING HIGH CARBON MONOXIDE CONDITIONS

CROSS-REFERENCE TO RELATED PATENT APPLICATIONS

This patent application claims the benefit of U.S. Provisional Patent Application No. 60/535,423, filed Jan. 8, 2004, the teachings and disclosure of which are hereby incorporated in their entireties by reference thereto.

FIELD OF THE INVENTION

The present invention relates generally to carbon monoxide detection systems, and more particularly to an appliance control system that limits operation of ignition sources and operates ventilating systems when a high level carbon monoxide has been detected.

BACKGROUND OF THE INVENTION

As consumer electronics continue to decrease in cost and increase in reliability and features provided, their use in many consumer products becomes more practical, and even desirable. One factor contributing to the acceptability of electronic controls in many consumer products, including consumer home appliances, is that the population as a whole is becoming more computer literate and used to electronic displays and push button controls. No longer are consumers turned off by electronic displays and control systems in favor of their electromechanical counterparts. Indeed, consumers have come to demand increased sophistication in the cycles provided by their appliances.

To meet this demand, many manufacturers are now providing multi-functional electronic controls in their consumer appliances. As an added benefit of these electronic controls, manufacturers are able to incorporate intelligence and communications capability into the controls. As such, these electronic controls add greater flexibility to the operation of the appliances and allow for integration of new functions which, before such integration, were not feasible. In addition to enhanced operability, these electronic controllers also provide diagnostic system checking to ensure that the appliance is operating properly.

Unfortunately, even when operating properly, the operation of ignition or combustion sources, such as those included in stoves, furnaces, hot water heaters, etc., create carbon monoxide as a byproduct. When one of these appliances malfunctions, the possibility of increased production of carbon monoxide could create a hazardous condition which could endanger the lives of the occupants.

To minimize the risk that occupants could be overcome by excessive carbon monoxide within a dwelling due to appliance malfunction or other sources, many consumers have now chosen to install carbon monoxide detectors throughout their dwellings. Such detectors typically provide an audible warning that an excessive level of carbon monoxide has been detected. While such a carbon monoxide detector significantly reduces the chances that the occupants of a dwelling would be overcome by the toxic gas, if the consumers do not hear the audible alarm, for any number of reasons, the increasing levels of carbon monoxide within the dwelling could soon overcome the occupants.

There exists, therefore, a need in the art for coordinated operation between a detector that senses a high level of carbon monoxide and an appliance controller that can limit the operation of ignition/combustion sources that may be causing or exacerbating the hazardous condition. There also exists a need in the art for an appliance controller that can operate ventilation equipment to reduce or eliminate the hazardous condition without causing another.

BRIEF SUMMARY OF THE INVENTION

In view of the above, it is an object of the present invention to provide a new and improved appliance control network that regulates appliances having combustion sources once a high level of carbon monoxide has been detected within a dwelling. More particularly, the present invention is directed to an appliance control system that utilizes an intelligent thermostat that receives warning information from a carbon monoxide detector indicating that high levels of carbon monoxide have been sensed within the dwelling. The intelligent thermostat then operates to control appliances within the dwelling that contain combustion sources to reduce or eliminate the possibility of further carbon monoxide production by such appliances.

This intelligent thermostat also may operate the ventilation system to flush the dwelling with fresh air in an attempt to lessen or eliminate the concentration of carbon monoxide within the dwelling. Coordinated operation with interior and exterior temperature sensors ensures that such ventilation does not result in a freezing condition within the dwelling, which might otherwise result in damage to water pipes, etc., within the dwelling. Such coordinated operation opens the ventilation system to bring in fresh air when the exterior temperature is greater than a first level, further periodically operates the furnace to maintain a minimum interior temperature when the exterior temperature is below the first level but above a second level, and jointly operates the furnace and ventilation system to maintain the interior temperature at the minimum level when the exterior temperature is below the second level. In this way, the probability that the occupants within the dwelling will be overcome by rising levels of carbon monoxide is greatly reduced should those occupants fail to be alerted by the carbon monoxide alarm.

In an embodiment of the present invention, an advanced thermostat that includes a user interface and wireless or wired network communications capability to enable control and diagnostic communications between the thermostat and the various consumer appliances in the home, and between the thermostat and a carbon monoxide detector. The thermostat user interface allows the homeowner to view warning information describing the hazardous condition and the current operating mode of the thermostat. The thermostat also sends control signals to the appliances that contain ignition/combustion sources to disable or otherwise reduce their operations so that the production of carbon monoxide, even in normal amounts, will be precluded or greatly lessened. Such control signals may be transmitted to the appropriate appliances via wireless communication, or wired communication. The wired communication may utilize individual connections between the thermostat and the individual appliances, or may utilize a system BUS to which each of the appliances and the thermostat attach. The communication of the warning signal information from the carbon monoxide detector may similarly utilize wireless or wired communication. In this way, the system of the present invention limits the operation of appliances that may be the cause or that could exacerbate the high carbon monoxide condition.

In a preferred embodiment of the present invention, the thermostat also operates HVAC components to reduce or eliminate the high carbon monoxide condition, without allowing a freezing condition to be created. As introduced above, the thermostat may operate to open a damper and turn on an associated blower fan that allows fresh air to be circulated within the dwelling. The operation of the damper and the blower fan is preferably coordinated with temperature sensors to ensure that a freezing condition does not develop within the dwelling as a result of operation of the ventilating system. In one embodiment an exterior temperature sensor is utilized as well as the typical interior temperature sensor of the dwelling.

The intelligent thermostat operates to open the damper and turn on the blower fan to circulate fresh air through the dwelling when the exterior temperature is greater than a first preset temperature value. In one embodiment of the present invention, this preset temperature value is set at 50° F. If the exterior temperature is less than this first predetermined temperature but greater than a second predetermined temperature, for example 40° F., the thermostat operates to open the damper and turn on the blower fan, and periodically operates the furnace to maintain the interior temperature at a minimum value. In one embodiment of the present invention, the minimum value is set at approximately 45° F. Finally, if the exterior temperature is less than the second predetermined temperature, for example 40° F., the thermostat operates to only open the damper and turn on the blower fan when it operates the furnace to maintain an interior temperature of approximately 45° F.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is a graphical illustration of a temperature control profile used in an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
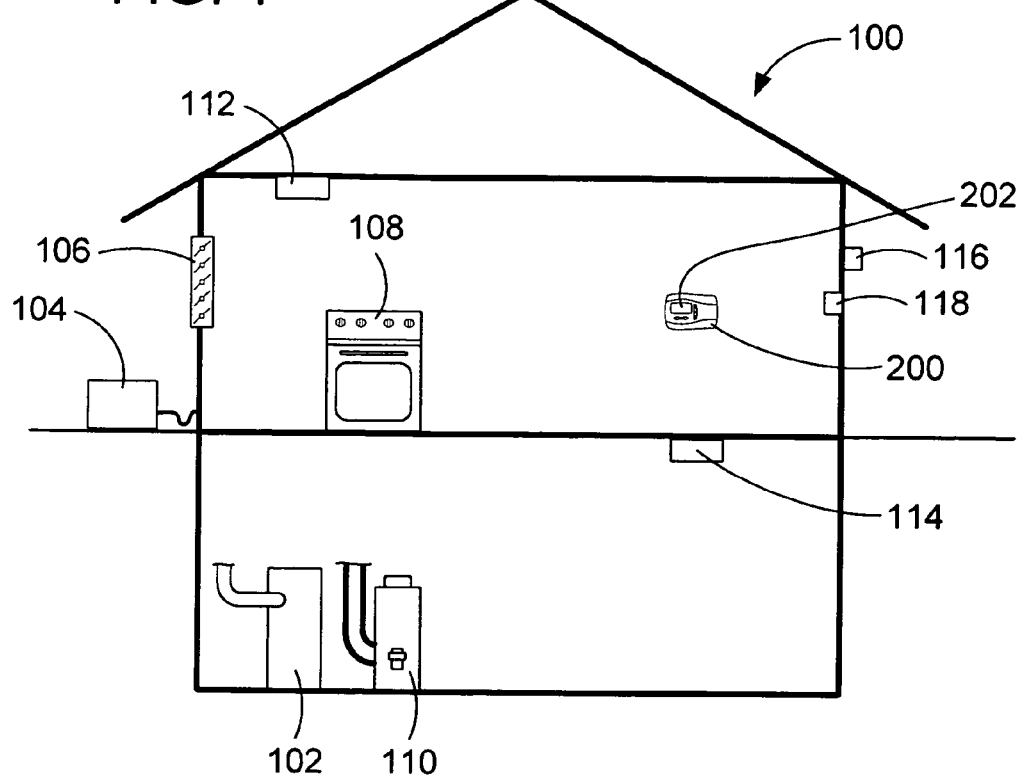
FIG. 1 is a simplified illustration of a home environment containing a plurality of consumer appliances in which the system of the instant invention is installed.

FIG. 1 illustrates a simplified home environment 100 into which the system of the present invention finds particular applicability. However, one skilled in the art will recognize that the system of the present invention is not limited to a home environment, but may also be installed in a commercial environment, etc. This typical home environment 100 includes an intelligent thermostat 200. As is typical, the thermostat 200 controls heating of the home environment 100 by the furnace 102, and possibly cooling of the home environment 100 by the air conditioning system 104. In some installations, the air conditioning system also includes a damper system 106 that allows fresh air to be circulated into the environment 100. The interface to both the furnace 102, the air conditioning system 104, and the damper 106 is typically pre-wired in the home environment 100, although the communications control from the thermostat 200 may also be wireless as desired by providing receiver/transmitter circuitry in the furnace 102, air conditioning system 104, and/or the damper 106. Similar receiver/transmitter circuitry is also required in thermostat 200 to provide this communications capability.

The typical home environment 100 also includes a plurality of consumer appliances, such as a stove 108, hot water heater 110, etc. As discussed above, many such appliances 102-110 now include electronic controllers that regulate operation of the appliance. With the provision of such electronic controllers, communication circuitry may also now be included in these appliances to allow coordinated operation, enhanced diagnostic features, and remote controllability. Preferably, such communication circuitry includes wireless receiver/transmitter circuitry. However, the system of the present invention also allows for wired communication with the appliances via discreet wires, or via a communications BUS to which the appliance is attached as will be discussed more fully below. Through the provision of such communications, the system of the present invention is particularly enabled.

Specifically, the system of the present invention includes an intelligent thermostat 200 that is capable of receiving carbon monoxide warning information from carbon monoxide detectors, for example detectors 112, 114, located throughout the home environment 100. When any of the carbon monoxide detectors 112, 114 signal that a high level of carbon monoxide has been detected, the intelligent thermostat 200 operates to regulate the operation of the appliances that contain a combustion source. In this way, the intelligent thermostat 200 attempts to reduce or eliminate further accumulation of carbon monoxide within the home environment that may be produced through normal operation of a combustion source in one of the appliances installed in the home environment, or through the malfunction of one of the appliances. In a typical home environment, these appliances include a furnace 102, the stove 108, and the water heater 110, although other appliances that include combustion sources or might otherwise operate or malfunction to produce carbon monoxide may also be included. Operation of these appliances, and in particular of the damper 106 and the furnace 102, may be coordinated through the usage of external 116 and internal 118 temperature sensors as will be discussed more fully below.

In order to provide the high carbon monoxide level information to the thermostat 200 of the present invention, the information must be communicated from the carbon monoxide detectors 112, 114 to the thermostat 200. This transmission of information may be facilitated by a wired network connecting each of the detectors 112, 114 to the thermostat 200. Other wired network structures may also be utilized, including the provision of a system BUS to which each of the appliances and detectors 102-114, or a combination thereof, and the thermostat 200 connect. As is well known in the art, information communicated on the system BUS includes address information identifying the source and/or destination of the information transmitted thereon. Such individual addressing is not typically required in the wired network whereby each individual appliance and/or detector is separately wired to the thermostat 200. Various other wired infrastructures could be utilized with the system of the present invention, and are considered within the scope thereof.

With the increasing use, sophistication, reliability, data rates, and security of wireless communication protocols, a preferred embodiment of the present invention utilizes wireless communication between the appliances, detectors, and thermostat to communicate system information and control signals therebetween. However, it is recognized that not all of the consumer appliances or detectors may include such wireless communications capability. Therefore, a preferred embodiment to the thermostat 200 of the present invention includes the capability to communicate both wirelessly and through a wired connection. For the wireless communication, various wireless communication protocols and standards may be implemented depending upon the particular home environment 100 in which the system is to be installed. That is, while the Bluetooth wireless standard may be utilized in a very small environment, its range limitations may make it unsuitable for larger or typical home environments 100. However, there are numerous other wireless protocols that can be utilized to provide the wireless connectivity between the thermostat 200 and the appliances and detectors. These other wireless protocols include, but are not limited to, the 802.11 or 802.15 family of standards. While proprietary wireless protocols may also be utilized, the use of a standard wireless protocol ensures interoperability with appliances and detectors by different manufacturers.

Figure 2:
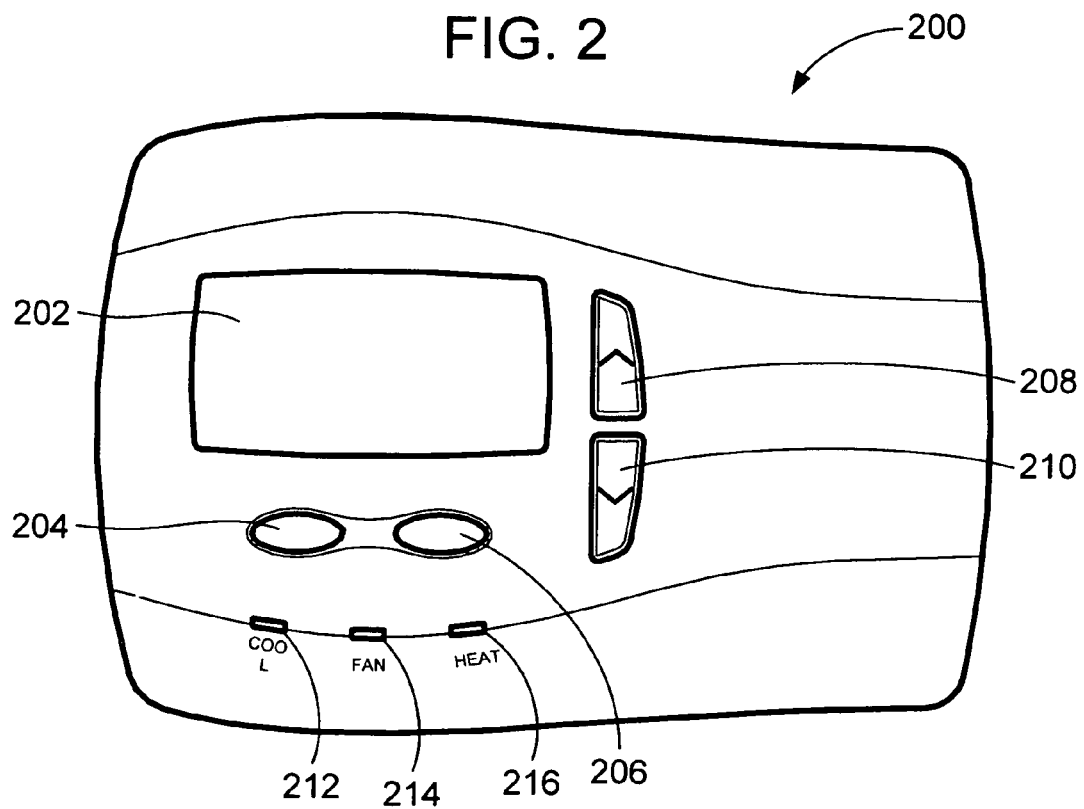
FIG. 2 is a front view illustration of one embodiment of an advanced thermostat constructed in accordance with the teachings of the present invention.

An embodiment of a thermostat constructed in accordance with the teachings of the present invention to incorporate the coordinated appliance control upon detection of a high carbon monoxide condition of the invention is illustrated in FIG. 2. As may be seen from this FIG. 2, this embodiment of the thermostat 200 includes a user display 202 on which is typically displayed programmatic, system, and ambient information regarding the operation of the HVAC system with which it is typically associated. This user display 202 may take various forms as are well-known in the art, and in a preferred embodiment is a dot matrix LCD display.

With such a display 202, the consumer may activate various programmatic and control functions via a pair of soft keys 204, 206. The functionality executed by these soft keys 204, 206 varies dependent upon the programmatic state in which the thermostat 200 is at the time one of the soft keys 204, 206 is depressed. The particular functionality that will be instituted upon selection of one of the soft keys 204, 206 is displayed in an area of the user display 202 proximate the key 204, 206 which will institute that function. That is, the function that will be instituted upon selection of soft key 204 will be located generally in the lower left hand portion of user display 202 while the functionality that will be instituted by selection of soft key 206 will be located generally in the lower right hand portion of user display 202. These functional indicators may change depending on the program state and mode in which the thermostat is currently operating.

In addition to the soft keys 204, 206, this embodiment of the thermostat 200 of the present invention also includes adjustment keys 208, 210. These adjustment keys 208, 210 may serve to adjust a currently selected parameter up or down, such as in the case of setting the control temperature at which the thermostat will maintain the ambient environment. Additionally, these keys 208, 210 may scroll through the available data for a selected parameter, such as scrolling through alphanumeric data that may be selected for a given parameter. These keys 208, 210 may also function as soft keys depending on the programmatic state in which the thermostat is operating. When this functionality is provided, the function that will be instituted by selection of key 208 will be provided generally in the upper right hand corner of display 202, while the functionality that will be instituted by selection of key 210 will be displayed generally in the lower right hand corner of user display 202. In addition to the above, other user input means, such as an alphanumeric keypad, user rotatable knob, a touch screen, etc. may be utilized instead of the buttons 204-210 illustrated in the embodiment of FIG. 2.

In this embodiment, the thermostat 200 also includes operating mode visual indicators 212, 214, 216. These indicators 212-216 provide a visual indication of the current operating mode of the thermostat. In the embodiment illustrated in FIG. 2, indicator 212 will illuminate while the thermostat 200 is operating in the cooling mode. Indicator 216 will illuminate while the thermostat 200 is operating in the heating mode. Finally, indicator 214 will illuminate to indicate that the fan is operating. Depending on the particular application, this indicator 214 may illuminate whenever the fan is running, or may illuminate only when the fan is selected to run continuously.

In embodiments of the present invention that do not utilize automated switching control between the heating and cooling modes of operation, these indicators 212-216 may operate as user selectable switches to allow the consumer to select the operating mode of the thermostat 200. For example, during the summer months the consumer may select the cooling mode by depressing indicator 212. In this mode, the furnace will not be turned on even if the interior ambient temperature drops below the set point. To switch from the cooling to the heating mode of operation, the consumer, in this alternate embodiment, would need to select indicator 216 to allow the thermostat 200 to operate the furnace. Consumer selection in this embodiment of indicator 214 would operate the fan continuously, as opposed to its normal automatic operation based upon a call for cooling or heat by the thermostat 200. In a still further embodiment of the present invention, as will be discussed more fully below, the indicators 212-216 may also be utilized to provide a visual indication of system trouble or trouble with one of the appliances with which the thermostat 200 is in communication.

Having discussed the physical structure of one embodiment of a thermostat 200 constructed in accordance with the teachings of the present invention, the discussion will now focus on the operation of the system during detection of a high carbon monoxide condition which forms an aspect of the present invention. Indeed, while the following discussion will utilize the structure of the thermostat 200 illustrated in FIG. 2, those skilled in the art will recognize that various other structures can be utilized without departing from the spirit and scope of the present invention. That is, regardless of the user input mechanisms utilized by the particular embodiment of the thermostat 200 of the present invention, the communications and programmatic steps provided in the following discussion may be used.

Once at least one of the carbon monoxide detectors 112, 114 within a building senses a high carbon monoxide concentration, the detector operates to sound an audible warning to the occupants of the dwelling to alert them of this potentially hazardous condition. However, because some occupants may not be able to hear the audible warning, the intelligent thermostat 200 of the present invention disables or otherwise regulates the operation of appliances within the dwelling 100 (see FIG. 1) that may be contributing to the production and buildup of carbon monoxide within the dwelling. For example, the intelligent thermostat 200 will send a control signal to the stove 108 commanding it to turn off all sources of combustion. The thermostat 200 will also display a warning and informative message on the user interface screen 202 describing its current mode of operation as being in an emergency condition due to the sensing of high levels of carbon monoxide within the dwelling. The thermostat 200 will also send a control command to hot water heater 110 to disable its sources of combustion. Obviously, if either of these appliances requires a pilot flame, the command from the thermostat 200 will also include a command to close any gas valves that feed such pilots.

During this high carbon monoxide condition, the thermostat 200 also commands the furnace 102 to disable its sources of combustion. However, unlike the stove 108 and water heater 110 whose disablement merely results in possible inconvenience for the occupant of the dwelling, disabling the furnace 102 may result in a freezing condition being established within the dwelling. Such a freezing condition could then result in additional damage to the dwelling resulting from frozen and busted water pipes, etc. As such, the operation of the furnace 102 is preferably regulated by the intelligent thermostat 200 to minimize the operation of its combustion sources while preventing a freezing condition from developing within the dwelling 100.

This is accomplished in one embodiment of the present invention by regulating the internal temperature of the dwelling, as may be sensed by internal temperature sensor 118 that may be integrated with or separate from the thermostat 200, to a low temperature. Preferably, the thermostat 200 operates to only allow the internal temperature of the dwelling to drop to approximately 45° F. before turning the furnace 102 back on. The thermostat 200 will then operate to maintain the interior temperature of the dwelling at this low level so as to minimize the buildup of carbon monoxide while still preventing additional damage that may result from a freezing condition being allowed to occur.

In one embodiment of the present invention wherein the dwelling 100 includes a ventilation system that allows fresh air to be ventilated into the building, such as via the damper 106 (and associated blower fan, not shown), intelligent thermostat 200 of the present invention may also operate to not only prevent the further accumulation of carbon monoxide within the dwelling 100, but also to reduce the amount of carbon monoxide within the dwelling. Specifically, in dwellings that include a ventilation system, the thermostat 200, upon receiving the high concentration of carbon monoxide signal from one of the carbon monoxide detectors 112, 114, operates to open the fresh air damper 106 to flush the environment with fresh air. This will significantly reduce the concentration of carbon monoxide within the dwelling 100. Indeed, this operation of the ventilating system via thermostat 200 may occur without any other control of the appliances.

Such an embodiment is particularly useful in dwellings where old appliances that do not have remote control features are installed. That is, if the water heater 110 and/or stove 108 do not include remote controllability, the thermostat 200 will be unable to disable their sources of combustion. However, by operating the ventilating system, the concentration of carbon monoxide within the dwelling 100 should nonetheless be reduced. Indeed, the "airing out" of the dwelling is often recommended once a high concentration of carbon monoxide has been detected therein.

In embodiments of the present invention that utilize a fresh air ventilation system, whether or not separate appliance control is provided, the system of the present invention also includes operative programming to prevent the establishment of a freezing condition within the dwelling. That is, since the furnace 102 is most often used during cold weather, the operation of the ventilation system to bring in fresh outside air into the dwelling will typically result in a reduction in the interior temperature of the dwelling 100. Recognizing this, one embodiment of the present invention utilizes a temperature control profile, such as that illustrated in FIG. 3. When such a profile is utilized, the thermostat 200 monitors the external temperature via a temperature sensor 116 to determine the proper coordinated operation of the damper 106 (and associated blower fan) and furnace 102. When the external temperature 300 is greater than, e.g., approximately 50° F., as illustrated by area 302, the thermostat 200 operates to open damper 106 and turn on its associated blower fan, and to disable the furnace 102. As a result of the operation during such conditions, the internal temperature of the dwelling 100 will be reduced to the external temperature. However, since this external temperature is greater than, e.g., approximately 50° F., there is no threat of an internal freezing condition from developing.

However, if the temperature is below this value, e.g., 50° F. but greater than, e.g., approximately 40° F., as represented by area 304 under the external temperature line 300 of FIG. 3, the thermostat 200 operates to open damper 106 (and turn on the associated blower fan). The thermostat 200 then monitors the internal ambient temperature via temperature sensor 118. If the internal temperature drops below a preset temperature, e.g., approximately 45° F., the thermostat 200 operates to turn on the furnace 102 to regulate the internal temperature to this value. In this way, an internal freezing condition is precluded, while still allowing maximum circulation of fresh air within the dwelling to reduce the concentration of carbon monoxide therein. Since the temperature differential between the interior and exterior of the dwelling 100 is small within this range 304, the furnace 102 will be operated only sporadically, which should not exacerbate the carbon monoxide problem, especially in view of the amount of fresh air that will have been and will continue to be brought into the dwelling 100.

If the external temperature sensed by thermostat 200 drops below, e.g., approximately 40° F., the potential for development of a freezing condition within the dwelling should the damper remain open strongly exists. As such, the thermostat 200 operates to first open the damper 106 and turn on the associated ventilation fan while disabling furnace 102. This operation is continued until the interior temperature drops to, e.g., approximately 45° F. Continuing from this point, the thermostat 200 operates to coordinate operation of the damper 106 and furnace 102 such that the damper 106 is only opened when furnace 102 is turned on to maintain an interior temperature of approximately 45° F. While operation of the furnace is more likely during periods of extreme cold, any production of carbon monoxide resulting therefrom will be offset by the flow of fresh air through the ventilating system during these periods of operation of the furnace. This should reduce the likelihood that high levels of carbon monoxide may be built up within the dwelling.

While the foregoing operational graph of FIG. 3 utilizes particular temperature values, those skilled in the art will recognize that other values may be chosen without departing from the spirit and scope of the invention. Further, the system of the present invention is not intended to dispense with the need to call the appropriate emergency agency or repair personnel once a high carbon monoxide condition has been detected within a dwelling. Instead, the system of the present invention is intended to increase the likelihood of survivability in situations where high concentrations of carbon monoxide have been detected. Such is particularly important when the occupants of the dwelling are unable to hear the audible warning issued by the carbon monoxide detectors.

The intelligent thermostat of the present invention increases this likelihood of survivability by controlling the appliances that have combustion sources so that they do not exacerbate the hazardous condition or further aid the build up of high concentrations of carbon monoxide within a dwelling. Preferably, the thermostat operates to ventilate the interior of the dwelling with fresh air so as to actually reduce the concentration of carbon monoxide within the dwelling. This is preferably accomplished while preventing a freezing condition from being established within the building that could cause damage.

While a preferred embodiment of the present invention utilizes the intelligent thermostat 200 to coordinate the operation of the various subsystems, appliances, etc., the system of the present invention also contemplates autonomous control by each of these subsystems, appliances, etc., upon receipt of a carbon monoxide detected signal transmitted from a carbon monoxide detector. That is, if the carbon monoxide detector, e.g. 114, were to detect carbon monoxide, it would transmit a warning signal via the communications network (wired and/or wireless). Each of the individual components connected to the communications network would autonomously disable their sources of combustion so as to not exacerbate the hazardous condition. For example, the water heater 110 upon receipt of the carbon monoxide detection signal would operate to disable its sources of combustion. Likewise, other detectors in the building, e.g. detector 112, could also receive this carbon monoxide detected signal and sound its audible alert to notify the occupants of the hazardous condition.

Further, in embodiments of the present invention that utilize a central control point to coordinate operation of the system, this central control point need not be a thermostat. That is, the central control point could be a separate controller having a user interface whose functionality is limited to coordination of and communication with the components in the system. This separate controller may be a stand alone controller, may be a PC application, etc. Additionally, in embodiments of the present invention in which an intelligent thermostat provides this central control point, the user interface and the control portions of such a thermostat need not be integrated into a single housing. That is, the user interface may be mounted in a commonly user accessed area for convenience, while the control electronics could be located remotely from the user interface.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of controlling an appliance having a source of combustion during a hazardous condition, comprising the steps of:

receiving a carbon monoxide (CO) warning signal;

disabling the source of combustion of the appliance;

wherein the step of receiving the carbon monoxide (CO) warning signal comprises the step of receiving by a thermostat the carbon monoxide (CO) warning signal transmitted by a hazardous condition detector, and wherein the step of disabling the source of combustion of the appliance comprises the step of transmitting by the thermostat an appliance control signal to an electronic controller of the appliance commanding the electronic controller of the appliance to extinguish any source of combustion of the appliance;

energizing a ventilation system to provide fresh air; and wherein the step of energizing the ventilation system comprises the steps of:

monitoring an external temperature; and enabling operation of the ventilation system when the external temperature is above a first predetermined set point.

2. The method of claim 1, further comprising the steps of:

monitoring an internal temperature at least when the external temperature is below the first predetermined set point;

enabling operation of the ventilation system when the external temperature is below the first predetermined set point; and operating a furnace when the internal temperature drops below a second predetermined set point.

3. A method of controlling an appliance having a source of combustion during a hazardous condition, comprising the steps of:

receiving a carbon monoxide (CO) warning signal;

disabling the source of combustion of the appliance;

wherein the step of receiving the carbon monoxide (CO) warning signal comprises the step of receiving by a thermostat the carbon monoxide (CO) warning signal transmitted by a hazardous condition detector, and wherein the step of disabling the source of combustion of the appliance comprises the step of transmitting by the thermostat an appliance control signal to an electronic controller of the appliance commanding the electronic controller of the appliance to extinguish any source of combustion of the appliance;

the method further comprising the step of energizing a ventilation system to provide fresh air;

wherein the step of energizing the ventilation system comprises the steps of:

monitoring an external temperature;

enabling operation of the ventilation system when the external temperature is above a first predetermined set point;

the method further comprising the steps of monitoring an internal temperature at least when the external temperature is below the first predetermined set point;

enabling operation of the ventilation system when the external temperature is below the first predetermined set point;

operating a furnace when the internal temperature drops below a second predetermined set point; and disabling the ventilation system when the internal temperature is above the second predetermined set point whenever the external temperature is below a third predetermined set point.

4. A method of controlling an appliance having a source of combustion during a hazardous condition, comprising the steps of:

receiving a carbon monoxide (CO) warning signal;

disabling the source of combustion of the appliance;

wherein the step of receiving the carbon monoxide (CO) warning signal comprises the step of receiving by a thermostat the carbon monoxide (CO) warning signal transmitted by a hazardous condition detector, and wherein the step of disabling the source of combustion of the appliance comprises the step of transmitting by the thermostat an appliance control signal to an electronic controller of the appliance commanding the electronic controller of the appliance to extinguish any source of combustion of the appliance;

energizing a ventilation system to provide fresh air; and wherein the step of energizing the ventilation system comprises the steps of:

monitoring an internal temperature; and regulating operation of the ventilation system to prevent the internal temperature to drop below a predetermined threshold.

* * * * *